March 24, 1964 P. C. WARNER 3,126,033
NUCLEAR REACTORS
Filed July 22, 1960
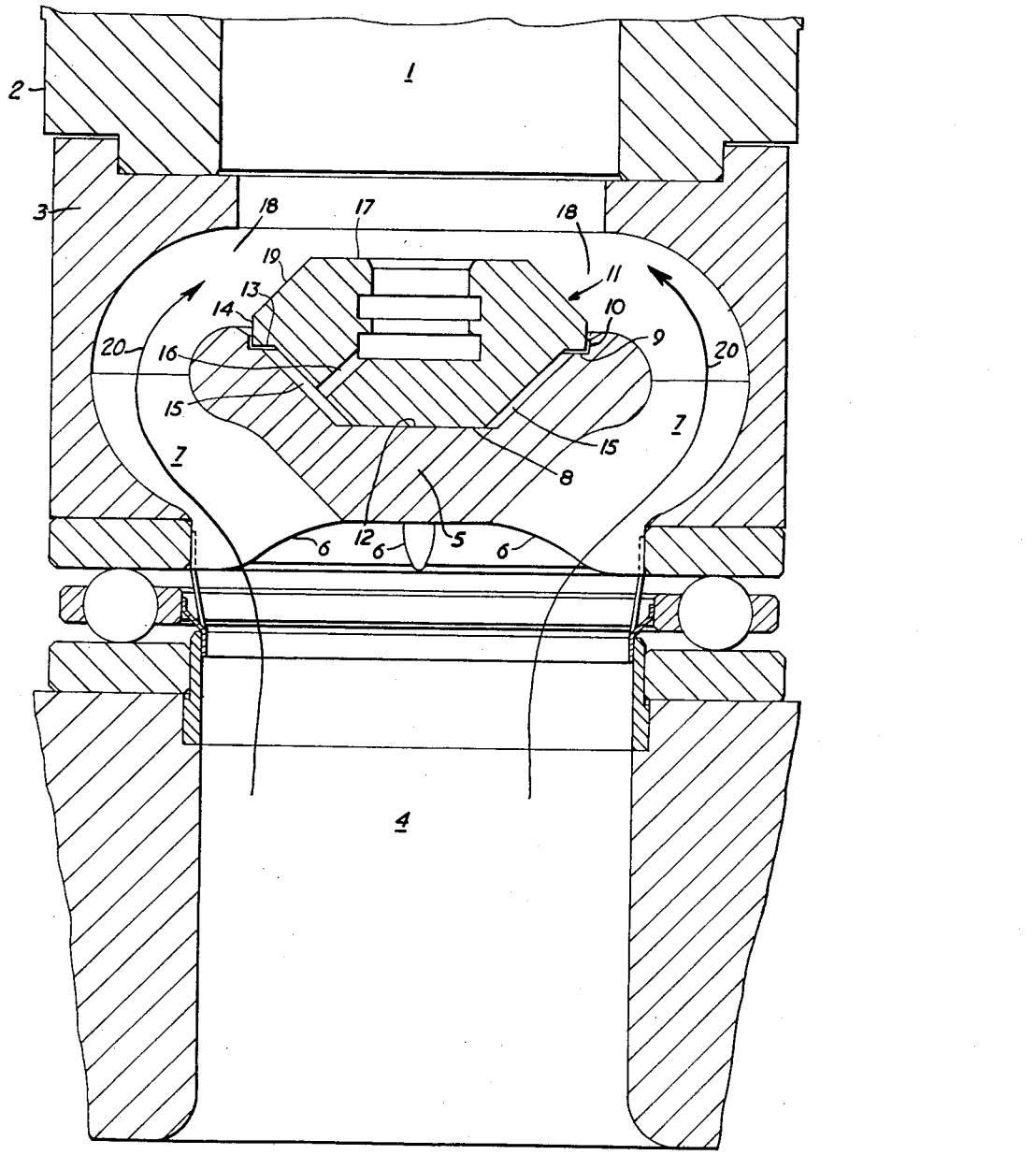
INVENTOR
PHILIP C. WARNER
BY Hall + Houghton
ATTORNEY

# United States Patent Office 3,126,033
Patented Mar. 24, 1964

3,126,033
NUCLEAR REACTORS
Philip Cloudesley Warner, Earls Court, London, England, assignor to United Kingdom Atomic Energy Authority, London, England, a British Authority
Filed July 22, 1960, Ser. No. 44,682
Claims priority application Great Britain July 31, 1959
4 Claims. (Cl. 138—43)

The present invention relates to nuclear reactors and in particular to the control of coolant flow in the vertical channels of gas-cooled nuclear power reactors.

In many known gas cooled nuclear reactors, the core region is defined by an assembly of graphite moderator material provided with vertical channels in which fuel elements are located, heat being removed therefrom by a stream of gas flowing through the channels. The flow of coolant gas is commonly upwards from a distribution zone beneath the core through the channels to a space above the core. At least some of the channels are restricted at their lower ends in order to ensure that heat is removed at the highest outlet gas temperature. The restriction of the coolant flow is often achieved by means of channel gags which are put in the bottom of the channel. In order to facilitate adjustment, the gags must preferably be removable and hence it is not possible to secure them in position by trapping them under the graphite structure. So that they should not be blown out by the upward pressure differential which it is their job to provide they must be secured by locking devices such as bayonet fasteners or by the use of screw threads. Their removal then calls for complicated and unreliable handling gear.

It is an object of the invention to provide a removable restriction for a coolant channel of a nuclear reactor which will remain in its position without the need of mechanical locking devices.

According to the present invention a restrictor for a coolant channel of a nuclear reactor comprises a removable gag member restricting the coolant channel and adapted to be forced against a permanent location member and thereby retained in position by the combination of resultant forces acting downwards on the gag, said forces being the sum effect of static pressures round the gag, of the downward components of the momentum forces of the gas stream, and the weight of the gag.

Further according to the present invention a restrictor for a coolant channel of a nuclear reactor comprises a permanent location member and a removable gag member restricting the coolant channel and located downstream of and adjacent the location member, said members being provided with co-operating seats arranged to form a cavity between said members and said gag member having a passage formed therein connecting the cavity to the coolant channel so that the pressure in the cavity equals that in the coolant channel downstream of the restriction, whereby, in operation, the gag member is held in position against the location member by the combination of resultant forces acting downwards on the gag, said forces being the sum effect of static pressures round the gag, of the downward components of the momentum forces of the gas stream, and the weight of the gag.

The word "downstream" is used herein in respect of the normal direction of coolant flow.

The location member may be provided with a deflector whereby in operation coolant is constrained to enter the restriction in a direction normal to the axis of the coolant channel, the part of the gag member restricting the coolant flow also being provided with a deflecting portion adapted to return the direction of the coolant flow to that of the axis of the channel.

One embodiment of the invention will now be described by way of example with reference to the accompanying drawing which is a cross section of the bottom of a coolant channel in a nuclear reactor.

In the drawing, the lower end of a coolant channel 1 is formed in a graphite bottom reflector block 2. The block 2 is located on a mild steel support housing 3 at the top of lower coolant channel 4. Located inside the housing 3 is a permanent member 5 provided with deflector portions 6. The housing 3 and the member 5 together define an unrestricted but diverted channel 7 interconnecting the channels 1 and 4. A main seat 8 and a narrow ledge seat 9 are formed in the upper surface of the permanent member 5, and there is a cylindrical surface 10 above the ledge seat 9. A removable gag 11 is formed with a lower seat 12 adapted to engage the main seat 8, with an annular seat 13 adapted to fit the ledge seat 9 with a small clearance, and with a cylindrical surface 14 located within the cylindrical surface 10. A cavity 15 is thereby formed between the member 5 and the gag 11. A passage 16 connects the cavity 15 with the upper surface 17 of the gag 11. The gag 11 restricts opening 18 at the end of the channel 7 and is formed with a deflecting surface 19 at the restriction.

In operation, coolant flows up the lower channel 4 and is constrained by deflector portions 6 to pass through channel 7 and to enter opening 18 in a direction normal to the common axis of channels 1 and 4. The deflecting surface 19 turns the coolant flow into an axial flow along the channel 1. There is a pressure drop between channel 7 and the upper surface 17 of the gag 11 and, because of the passage 16, the pressure in the cavity 15 equals that in the channel 1 adjacent the upper surface 17. Coolant flow is indicated by the arrows 20.

Thus the gag is held downwards in position by a combination of forces resulting from the following: an intermediate pressure acting on the underside of the gag 11 over the radial width of the ledge seat 9, the lower downstream pressure acting on the rest of the underside of the gag 11: the weight of the gag 11 acting downwards; and an intermediate pressure acting over the deflecting surface 19 together with the downward component of the momentum forces of the gas stream.

The arrangement and the fit of the seats 8, 12; of the seats 9, 13 and of the surfaces 10, 14, respectively prevents any chattering of the gag 11, and also ensures that any shock loads on the top of surface 17 are transmitted directly to the main seat 8 without damage to the ledge seat 9.

The gag 11 is held in position only in the manner described and hence can be removed or replaced from above through the channel 1 by straightforward grab apparatus, there being no need for complicated screwing/unscrewing or locking/unlocking movements.

I claim:

1. A restrictor element for a vertical channel comprising in combination, a fixed location member in said channel, an upper face on said location member, a recessed seating formed in said upper face, an annular ledge formed round said seating, a channel restrictor element located in said seating, said element having a peripheral shoulder which fits said ledge with a small clearance and a portion extending into the recessed seating and spaced from a portion thereof by a cavity, and a passageway joining said cavity to the downstream side of the restrictor element.

2. A restrictor element for a vertical channel comprising in combination, a fixed location member in said channel, a deflector means on said location member whereby fluid in said channel is directed in a direction at right angles to said channel, an upper face on said location member, a recessed seating formed in said upper face, an annular ledge formed round said seating, a channel restrictor element located in said seating, said element having a peripheral shoulder which fits said ledge with a small clearance and a portion extending into the recessed seating and spaced from a portion thereof by a cavity, and a passageway joining said cavity to the downstream side of the restrictor element.

3. A restrictor element for a vertical channel comprising in combination, a fixed location member in said channel, deflector means on said location member whereby fluid in said channel is directed in a direction at right angles to said channel, an upper face on said location member, a recessed seating formed in said upper face, an annular ledge formed round said seating, a channel restrictor element located in said seating, said element having a peripheral shoulder which fits said ledge with a small clearance and a portion extending into the recessed seating and spaced from a portion thereof by a cavity, and a passageway joining said cavity to the downstream side of the restrictor element, and deflecting surfaces on said restrictor element for returning the fluid flow along the channel.

4. A restrictor assembly for a vertical channel comprising in combination a fixed location member within the channel to divert fluid flow in the latter around said location member, said location member having an upper face, a recessed seating surface on said upper face, said seating surface having a base and a side wall, a channel restrictor element seated on the base of said seating surface but spaced from the lower part of said side wall by a cavity formed between the restrictor element and said side wall, and a passage in said restrictor element communicating at one end with said cavity and at the other end with the downstream side of said restrictor element.

References Cited in the file of this patent
UNITED STATES PATENTS

| | | |
|---|---|---|
| 1,602,033 | McCarthy | Oct. 5, 1926 |
| 2,118,428 | Chrisman | May 24, 1938 |